United States Patent [19]

Baetz et al.

[11] Patent Number: 5,531,505

[45] Date of Patent: Jul. 2, 1996

[54] HEAD RESTRAINT FOR PASSENGER VEHICLES

[75] Inventors: Robert J. Baetz; John A. Dewar; Douglas K. Dunsmore; Christopher Harbowy; Dennis A. Majewski; Louis M. Shawbitz; Thomas A. Welch, all of Auburn Hills, Mich.

[73] Assignee: Tri-Con Industries, Ltd., Auburn Hills, Mich.

[21] Appl. No.: 201,546

[22] Filed: Feb. 25, 1994

[51] Int. Cl.$^6$ .................................................. A47C 7/36
[52] U.S. Cl. .............................................. 297/408; 297/464
[58] Field of Search .................................. 297/408, 396, 297/391, 216.2, 464, 184.12, 219.1, 486, 411.32, 114, 112, 403

[56] References Cited

U.S. PATENT DOCUMENTS

| | | | |
|---|---|---|---|
| 3,170,659 | 2/1965 | Wood | 297/391 |
| 3,376,064 | 4/1968 | Jackson | 297/391 |
| 3,466,091 | 9/1969 | DeGrusso | 297/486 |
| 3,713,694 | 1/1973 | Miller | 297/486 |
| 3,888,540 | 6/1975 | Protze et al. | 297/384 |
| 4,007,962 | 2/1977 | Müller-Deisig | 297/408 |
| 4,042,791 | 8/1977 | Wiseman | 179/146 H |
| 4,130,318 | 12/1978 | Hemmen et al. | 297/410 |
| 4,583,780 | 4/1986 | Finn | 297/184.12 |
| 4,778,218 | 10/1988 | Suman | 297/391 |
| 4,899,961 | 2/1990 | Herndon | 244/122 AG |
| 5,015,036 | 5/1991 | Fergie | 297/397 |
| 5,129,705 | 7/1992 | Wray | 297/397 |
| 5,205,611 | 4/1993 | Stephens | 297/391 |
| 5,236,246 | 8/1993 | Harrell | 297/408 |
| 5,255,955 | 10/1993 | Matosic | 297/395 |

Primary Examiner—Peter M. Cuomo
Assistant Examiner—Anthony D. Barfield
Attorney, Agent, or Firm—Zarley, McKee, Thomte, Voorhees & Sease; Mark D. Frederiksen

[57] ABSTRACT

A head restraint includes a generally U-shaped cradle pivotally connected to a head restraint main body with leg members of the cradle selectively pivotable between an articulated position projecting forwardly from the main body and a retracted position with the leg members generally coplanar with the main body. An elongated support axle extends through the main body and is rotatably mounted therein to pivot the cradle between the articulated and retracted positions. A detent is mounted to a base plate within the main body and selectively engages depressions around the circumference of the axle, to selectively retain the cradle in a variety of positions between the articulated and retracted orientations.

30 Claims, 4 Drawing Sheets

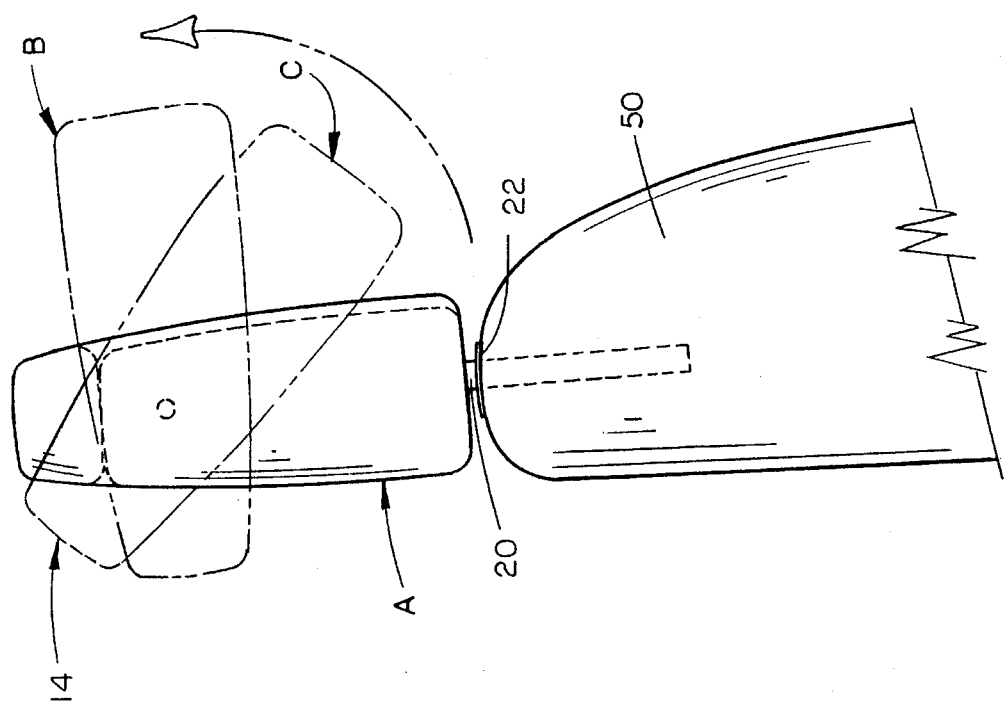
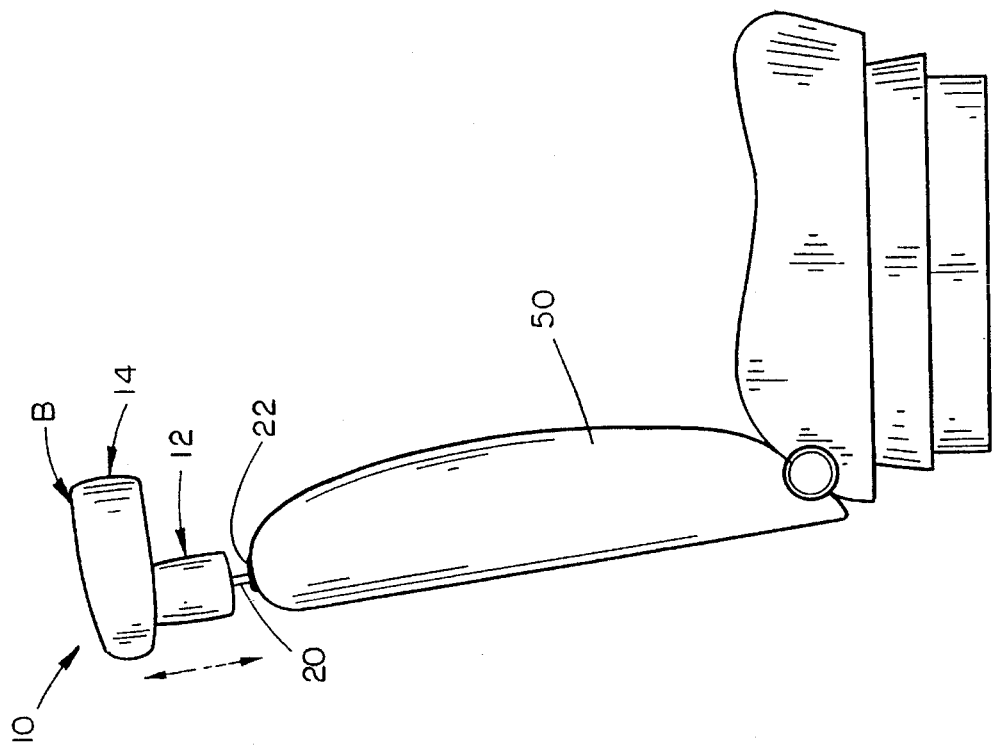

HEAD RESTRAINT FOR PASSENGER VEHICLES

TECHNICAL FIELD

The present invention relates generally to head restraints for vehicle seats, and more particularly to an improved head restraint with an articulating cradle for supporting the head of a passenger.

BACKGROUND OF THE INVENTION

Passenger seats for vehicles have many features which increase the passenger's comfort while riding in the seat. For example, many vehicle seats have reclining backs, adjustable lumbar supports, vertical and horizontal seat adjustments, as well as extendable and retractable head restraints. However, even with the great adjustability available on passenger seats, it is still quite common for a passenger desiring to rest or sleep in the passenger seat to fold or stuff pillows against the vehicle door or side frame. The passengers' body must then be repositioned to lean against the door or side frame for support on the pillow.

Not only is it inconvenient to transport one or more pillows in the vehicle for this purpose, but the position of the body against the door or side frame of the vehicle may prevent the effective use of safety features such as shoulder seat belts and passenger-side air bags. In addition, the positioning can be awkward, to such a degree that it causes muscle aches for the passenger.

SUMMARY OF THE INVENTION

It is therefore a general object of the present invention to provide an improved head restraint for supporting a passenger's head while the passenger is seated in the passenger seat.

Yet another object of the present invention is to provide a head restraint with an articulating cradle to support the head away from the doors and side panels of the vehicle.

Still another object of the present invention is to provide an articulating head restraint which does not interfere with the functioning of the seat.

The head restraint of the present invention includes a generally U-shaped cradle pivotally connected to a head restraint main body with leg members of the cradle selectively pivotable between an articulated position projecting forwardly from the main body and a retracted position with the leg members generally coplanar with the main body. An elongated support axle extends through the main body and is rotatably mounted therein to pivot the cradle between the articulated and retracted positions. A detent is mounted to a base plate within the main body and selectively engages depressions around the circumference of the axle, to selectively retain the cradle in a variety of positions between the articulated and retracted orientations.

BRIEF DESCRIPTION OF THE DRAWINGS

FIG. 4 is a side elevational view of a conventional passenger seat with the head restraint of the present invention installed thereon;

FIG. 5 is an enlarged side elevational view of the head restraint on a passenger seat showing the articulated movement thereof in broken lines.

DESCRIPTION OF THE PREFERRED EMBODIMENT

Figure 1:
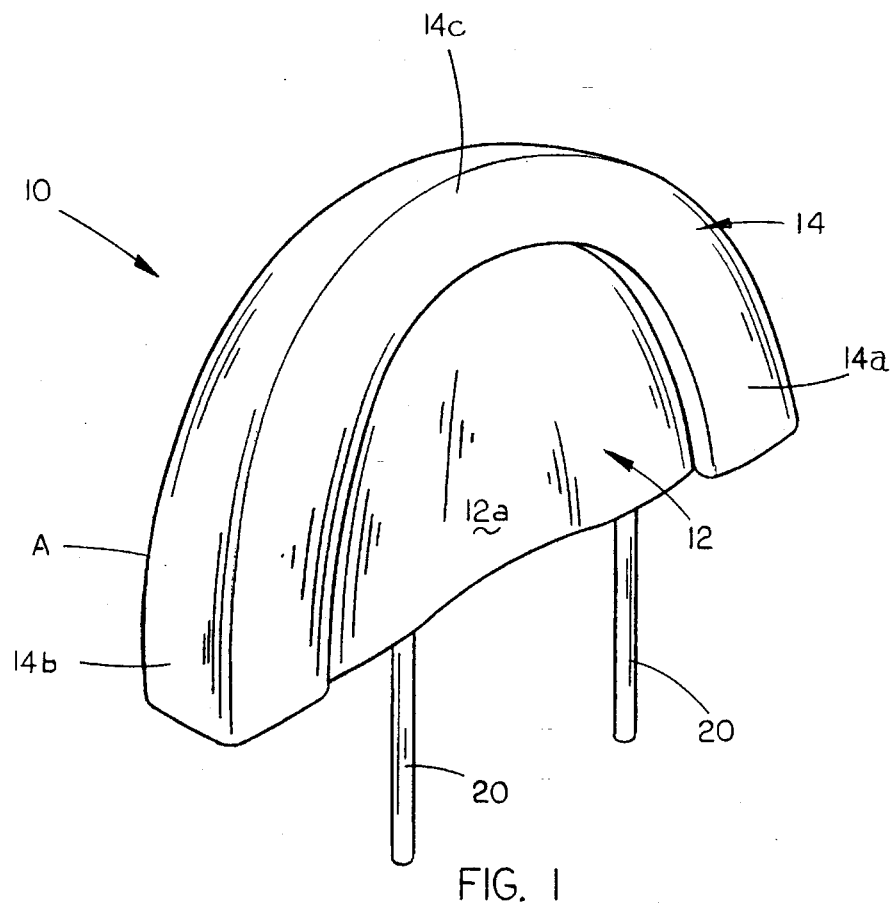
FIG. 1 is a perspective view of the head restraint of the present invention with a support cradle shown in a retracted position.
Figure 2:
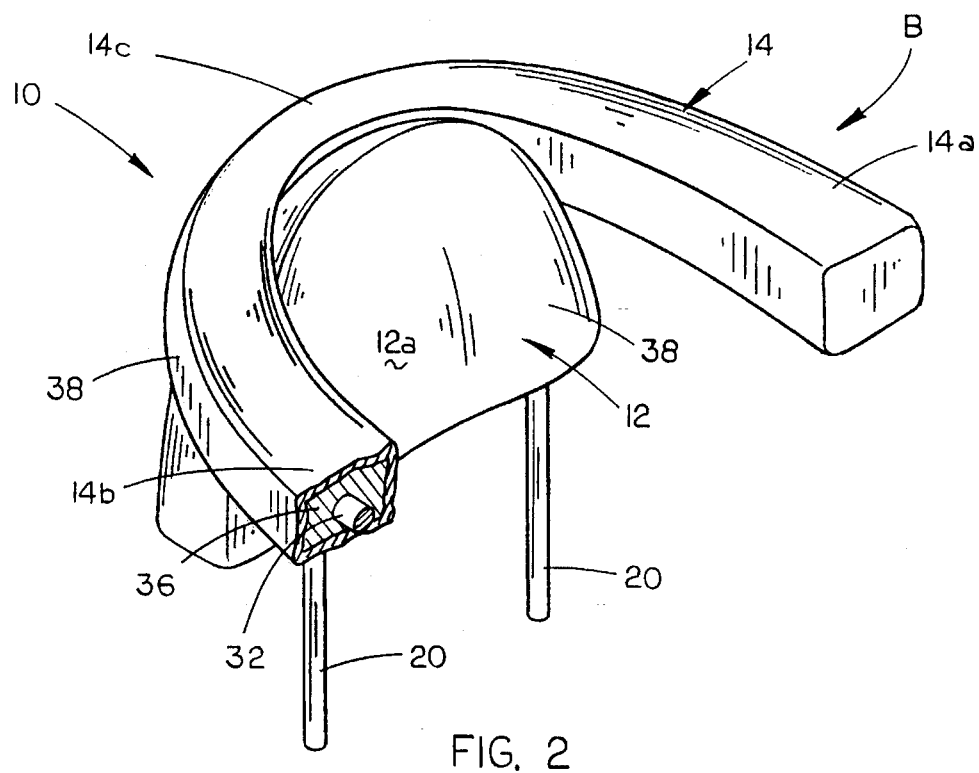
FIG. 2 is a perspective view of the head restraint with a support cradle in an articulated position.

Referring now to the drawings, in which similar or corresponding parts are identified with same reference numeral, and more particularly to FIGS. 1 and 2, the head restraint of the present invention is designated generally at 10 and includes a main body 12 and an articulating cradle 14 pivotally connected to main body 12.

Figure 3:
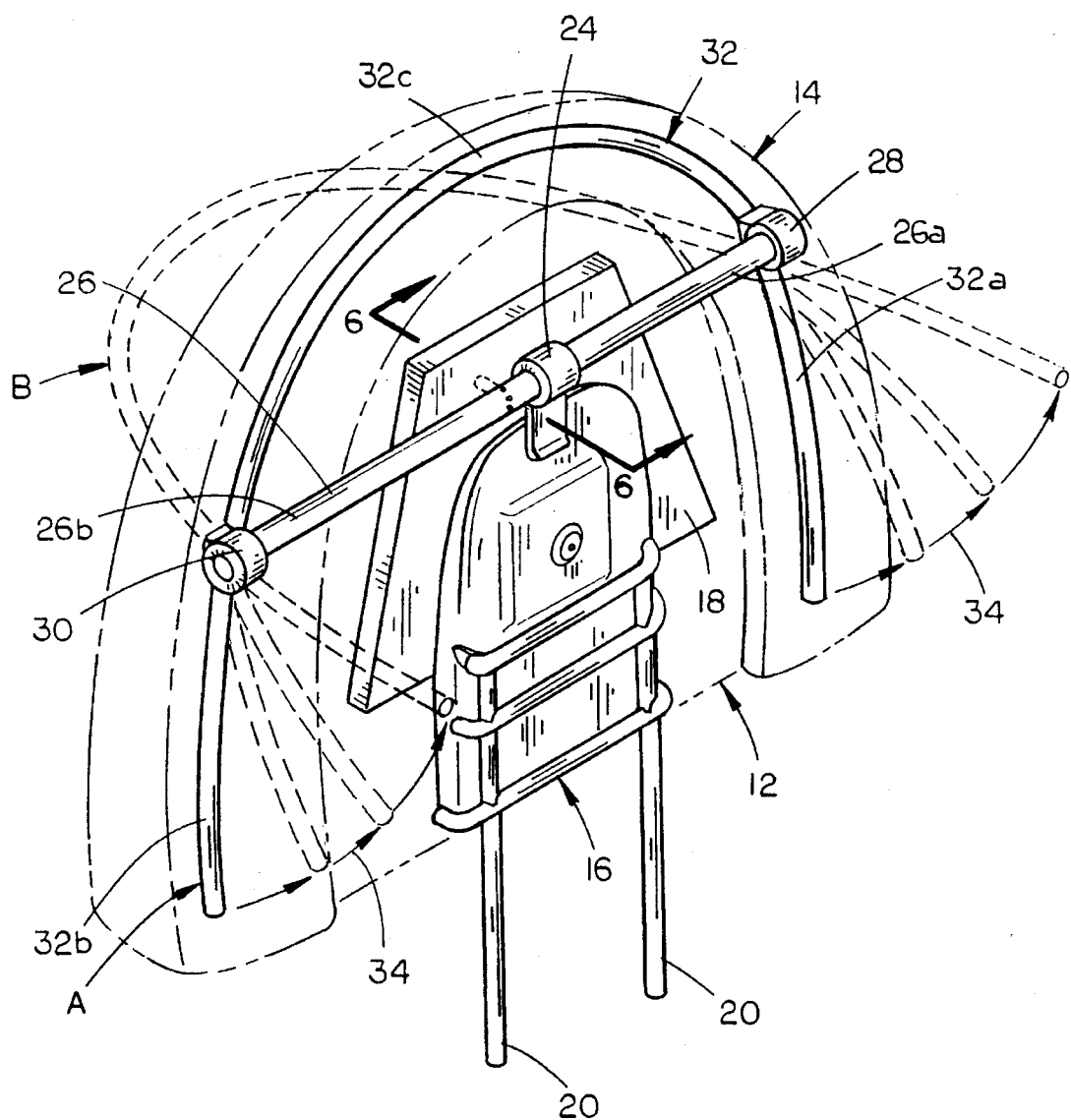
FIG. 3 is a perspective view of the support frame of the head restraint, showing various articulated positions in broken lines.

Referring now to FIG. 3, main body 12 includes a rigid support frame 16 having a base plate 18 with a pair of support rods 20 depending therefrom. Support rods 20 have dimensions designed for journaling within conventional head restraint receptacles 22, for selective extension and retraction, as shown in FIGS. 4 and 5. A sleeve 24 is affixed to the upper end of base plate 18, with the longitudinal axis of the sleeve oriented generally horizontally and parallel to the plane of base plate 18, as shown in FIG. 3. An elongated axle 26 is journaled through sleeve 24 and operably mounted for rotational movement within sleeve 24.

Axle 26 projects outwardly in opposite directions from sleeve 24 and has end pieces 28 and 30 affixed to the projecting ends 26a and 26b of axle 26. A generally inverted U-shaped rod 32 forms the support frame for cradle 14, and is affixed to end pieces 28 and 30 so as to permit pivotal movement of support frame 32 about the axis of axle 26. The attachment of support frame 32 to end pieces 28 and 30 visually divides support frame 32 into leg portions 32a and 32b and an arcuate connecting portion 32c.

As shown by arrows 34, support frame 32 may be selectively moved between a retracted position in a plane generally parallel to base plate 18, designated as "A" in FIG. 3, to a fully articulated position shown in broken lines and designated as "B", oriented in a plane generally orthogonal to the plane of base plate 18.

Support frame 32 of cradle 14 is completely encased in a soft foam pad 36 with an outer covering 38 formed of fabric, leather, or other material, as shown in FIG. 2. Similarly, support frame 16 (shown in FIG. 3) of main body 12 is covered with a foam pad and an outer covering 38.

Figure 6:
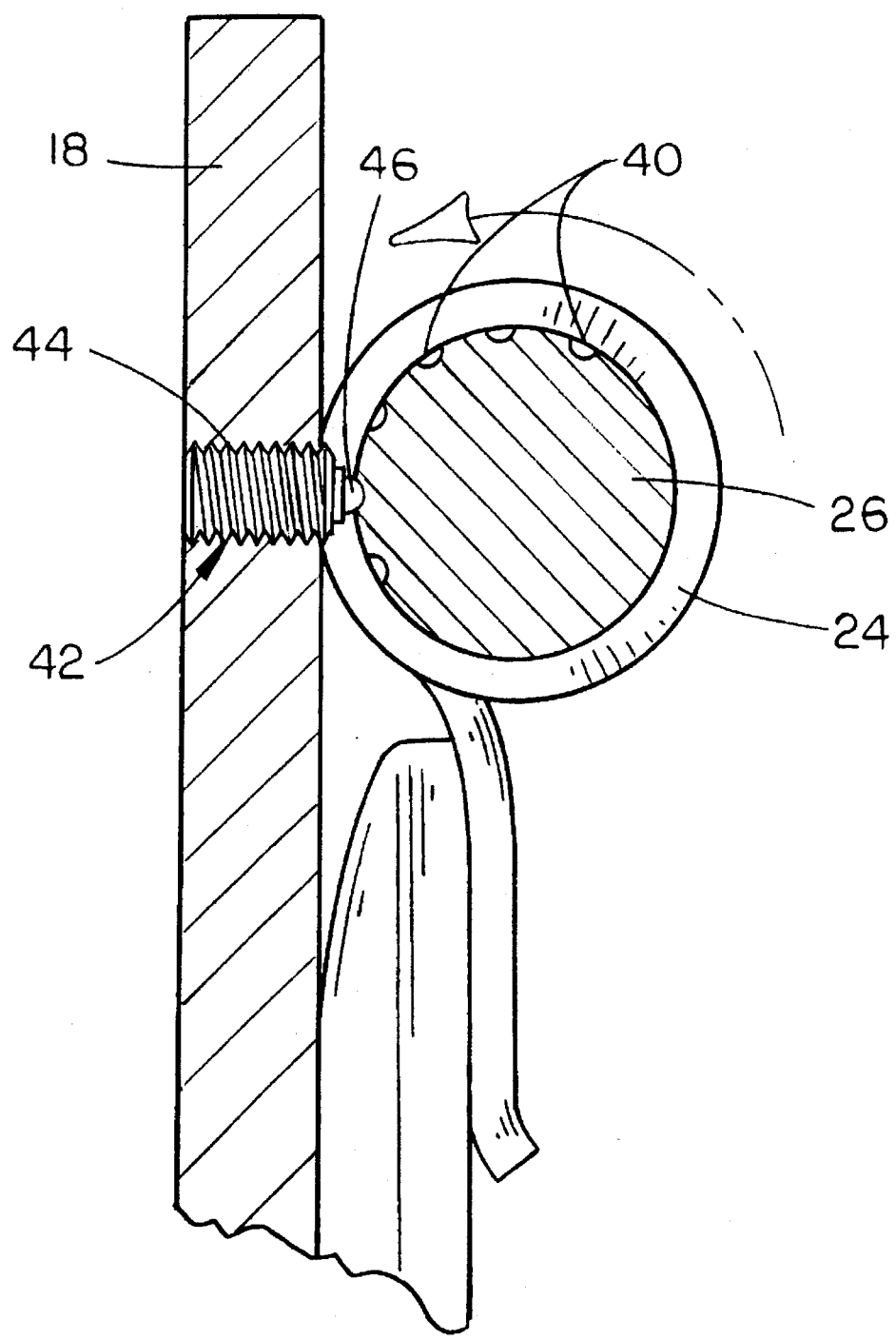
FIG. 6 is a sectional view taken at lines 6—6 in FIG. 3.

Referring now to FIG. 6, a plurality of generally hemispherical depressions 40 are formed in the surface of axle 26 and aligned around the circumference thereof in a transverse cross-sectional plane. A detent 42 is mounted through a threaded aperture 44 in base plate 18, and includes a spring operated pin 46 which selectively engages one of depressions 40, thereby retaining axle 26 in one of a variety of selected positions.

In operation, cradle portion 14 is conventionally stored in the retracted position "A" shown in FIGS. 1 and 5 with leg portions 14a and 14b and connecting portion 14c, generally coplanar with main body 12 and the seat back 48. When a passenger intends to rest, or would otherwise prefer head support, cradle portion 14 may be selectively pivoted to the fully articulated position "B" shown in FIGS. 2 and 4, generally orthogonal to the plane of main body 12 and seat back 48. In the fully articulated position, the projecting free ends of leg member 14a and 14b of cradle 14 extend forwardly relative to the forward surface 12a of main body 12, to comfortably support the passenger's head therebetween, while connecting portion 14c projects rearwardly of main body 12. As shown in FIG. 5, cradle 14 may also be selectively moved to a number of intermediate articulated positions, one such position being designated generally at "C", by virtue of the detent 42, described hereinabove.

Whereas the invention has been shown and described in connection with the preferred embodiment thereof, it should be understood that many modifications, substitutions, and additions may be made which are within the intended broad scope of the appended claims.

We claim:

1. A head restraint, comprising:
   a main body having a forward face, a rearward face, an upper end, and opposing first and second side edges; and
   a generally U-shaped cradle operably connected to said main body for selective movement between an articulated position and a retracted position;
   said cradle including a pair of first and second leg members connected together at one end by a connecting member to form the U-shape, said leg members each including a free end opposite the end connected to the connecting member;
   said cradle being operably connected for selective movement between the articulated position, wherein said second free ends project forwardly beyond the forward most extent of the main body forward face and the connecting member projects rearwardly beyond the rearward most extent of the main body rearward face, and a retracted position, wherein said second ends do not project forwardly of the main body forward face and the connecting member does not project rearwardly of the rearward face.

2. The head restraint of claim 1, wherein said cradle is pivotally connected on a horizontal axis oriented generally orthogonal to the forward face of the main body.

3. The head restraint of claim 1, wherein said cradle is pivotally connected to said main body for selective pivotal movement between said retracted and articulated positions.

4. The head restraint of claim 2, further comprising an elongated axle operably connected to said main body, having a first end projecting outwardly from the first side edge and a second end projecting outwardly from the second side edge of said main body, said leg members of said cradle connected to said first and second projecting axle ends with the axle ends located between the connecting member and the leg member free ends.

5. The head restraint of claim 4, wherein said connecting member is generally arcuate from the first leg member to the second leg member.

6. The head restraint of claim 5, wherein said leg members are generally arcuate to form a general arch shape with said connecting member.

7. The head restraint of claim 4, further comprising means operably associated with said axle for selectively retaining said leg members in said retracted and articulated positions.

8. The head restraint of claim 7, wherein said means operably associated with the axle further includes means for selectively retaining the leg members in at least one intermediate position between the retracted and articulated positions.

9. The head restraint of claim 1, further comprising means for selectively retaining said leg members in said retracted and articulated positions.

10. The head restraint of claim 9, wherein said means for selectively retaining said leg members includes means for selectively retaining the leg members in at least one intermediate position between the retracted and articulated positions.

11. In combination:
    a vehicle seat having a seat portion and a generally upright back portion, said back portion having an upper end;
    a head restraint mounted on the upper end of said back portion and including a main body having a front face, opposing first and second side edges and an upper end; and
    a generally U-shaped cradle having a pair of first and second left members connected together at one end by a connecting member to form the U-shape, said leg members each including a free end opposite the end connected to the connecting member, said free ends projecting forwardly past the forward face of the main body from a location immediately adjacent the main body first and second side edges, respectively;
    said cradle operably connected to said main body for selected movement of the left member free ends between an articulated position, wherein said free ends project forwardly beyond the forward most extent of the main body forward face and the connecting member projects rearwardly beyond the rearward most extent of the main body rearward face, and a retracted position, wherein said free ends do not project forwardly of the main body forward face and the connecting member does not project rearwardly of the rearward face.

12. The head restraint of claim 11, wherein said cradle is pivotally connected on a horizontal axis oriented generally orthogonal to the forward face of the main body.

13. The combination of claim 11, wherein said cradle is pivotally connected to said main body for selective pivotal movement between said retracted and articulated positions.

14. The head restraint of claim 11, further comprising an elongated axle operably connected to said main body, having a first end projecting outwardly from the first side edge and a second end projecting outwardly from the second side edge of said main body, said leg members of said cradle connected to said first and second projecting axle ends with the axle ends located between the connecting member and the leg member free ends.

15. The combination of claim 14, wherein said connecting member is generally arcuate from the first leg member to the second leg member.

16. The combination of claim 15, wherein said leg members are generally arcuate to form a general arch shape with said connecting member.

17. The combination of claim 14, further comprising means operably associated with said axle for selectively retaining said leg members in said retracted and articulated positions.

18. The combination of claim 17, wherein said means operably associated with the axle further includes means for selectively retaining the leg members in at least one intermediate position between the retracted and articulated positions.

19. The combination of claim 11, further comprising means for selectively retaining said leg members in said retracted and articulated positions.

20. The combination of claim 19, wherein said means for selectively retaining said leg members includes means for selectively retaining the leg members in at least one intermediate position between the retracted and articulated positions.

21. In combination:

a vehicle seat having a seat portion and a generally upright back portion, said back portion having an upper end;

a head restraint operably connected to the upper end of said back portion and including a main body, having a front surface, opposing first and second side edges and an upper end; and a generally U-shaped cradle having a pair of first and second left members connected together at one end by a connecting member to form the U-shape, said leg members each including a free end opposite the end connected to the connecting member, said free ends projecting forwardly past the forward face of the main body from a location immediately adjacent the main body first and second side edges, respectively;

said cradle operably connected to said main body for selective movement of the leg members between an articulated position, wherein said free ends project forwardly beyond the forward most extent of the main body forward face and the connecting member projects rearwardly beyond the rearward most extent of the main body rearward face, and a retracted position, wherein said free ends do not project forwardly of the main body forward face and the connecting member does not project rearwardly of the rearward face.

22. The combination of claim 21, wherein said cradle is pivotally connected about a horizontal axis generally orthogonal to the forward face of the main body.

23. The combination of claim 21, wherein said cradle is pivotally connected to said main body for selective pivotal movement between said retracted and articulated positions.

24. The combination of claim 1, further comprising an elongated axle operably connected to said main body, having a first end projecting outwardly from the first side edge and a second end projecting outwardly from the second side edge of said main body, said leg members of said cradle connected to said first and second projecting axle ends with the axle ends located between the connecting member and the left member free ends.

25. The combination of claim 24, wherein said connecting member is generally arcuate from the first leg member to the second leg member.

26. The combination of claim 23, wherein said leg members are generally arcuate to form a general arch shape with said connecting member.

27. The combination of claim 24, further comprising means operably associated with said axle for selectively retaining said leg members in said retracted and articulated positions.

28. The combination of claim 27, wherein said means operably associated with the axle further includes means for selectively retaining the leg members in at least one intermediate position between the retracted and articulated positions.

29. The combination of claim 21, further comprising means for selectively retaining said leg members in said retracted and articulated positions.

30. The combination of claim 29, wherein said means for selectively retaining said leg members includes means for selectively retaining the leg members in at least one intermediate position between the retracted and articulated positions.

* * * * *